(12) United States Patent
Knox et al.

(10) Patent No.: US 9,188,200 B2
(45) Date of Patent: Nov. 17, 2015

(54) MULTI-SPEED TRANSMISSION

(75) Inventors: Kevin Knox, Peoria, IL (US); James Rice, Deer Creek, IL (US); Larry Carpenter, Lizella, GA (US); Brian Oleson, Morton, IL (US); Kevin Meyer, Germantown Hills, IL (US); Peter Hodges, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 689 days.

(21) Appl. No.: 13/324,002

(22) Filed: Dec. 13, 2011

(65) Prior Publication Data
US 2013/0150201 A1    Jun. 13, 2013

(51) Int. Cl.
*F16H 3/66* (2006.01)
*F16H 3/62* (2006.01)
*F16H 3/44* (2006.01)

(52) U.S. Cl.
CPC ............. *F16H 3/66* (2013.01); *F16H 3/666* (2013.01); *F16H 2200/0069* (2013.01); *F16H 2200/0073* (2013.01); *F16H 2200/0086* (2013.01); *F16H 2200/2012* (2013.01); *F16H 2200/2046* (2013.01)

(58) Field of Classification Search
CPC ........... F16H 3/66; F16H 3/663; F16H 3/666; F16H 2200/0069; F16H 2200/2012; F16H 2200/2046; F16H 2200/0073
USPC ................................................ 475/275, 290
See application file for complete search history.

(56) References Cited

U.S. PATENT DOCUMENTS

| 6,634,980 | B1 | 10/2003 | Ziemer |
|---|---|---|---|
| 6,976,933 | B2 | 12/2005 | Haka |
| 6,991,578 | B2 | 1/2006 | Ziemer |
| 7,018,319 | B2 | 3/2006 | Ziemer |
| 7,090,610 | B2 | 8/2006 | Usoro et al. |
| 7,402,119 | B2 | 7/2008 | Kamada et al. |
| 7,691,024 | B2 | 4/2010 | Phillips et al. |
| 7,722,496 | B2 | 5/2010 | Phillips et al. |
| 7,828,690 | B2 | 11/2010 | Wittkopp et al. |
| 7,854,678 | B2 | 12/2010 | Kim |
| 7,892,136 | B2 | 2/2011 | Kim |
| 7,909,726 | B2 | 3/2011 | Phillips et al. |
| 7,914,414 | B2 | 3/2011 | Phillips et al. |
| 8,202,190 | B2 * | 6/2012 | Phillips et al. ............... 475/275 |
| 2010/0029431 | A1 | 2/2010 | Rodgers, II |

(Continued)

FOREIGN PATENT DOCUMENTS

| EP | 1388686 | 2/2004 |
|---|---|---|
| JP | 2005140139 | 6/2005 |
| KR | 1020090097635 | 9/2009 |

(Continued)

*Primary Examiner* — Edwin A Young
*Assistant Examiner* — Colby M Hansen
(74) *Attorney, Agent, or Firm* — John Wappel; Miller, Matthias & Hull LLP (57) ABSTRACT

A multi-speed transmission may include an input member and an output member disposed in a housing. A first planetary gear set, a second planetary gear set, a third planetary gear set, and a fourth planetary gear set may be disposed within the housing, each planetary gear set including a sun gear, a planet carrier, and a ring gear. Six control elements may be operably coupled to each of the planetary gear sets and selectively engagable to create a set of different gear ratios between the input member and the output member. The set of different gear ratios may include at least ten forward gear ratios and at least one reverse gear ratio.

20 Claims, 6 Drawing Sheets

(56) References Cited

U.S. PATENT DOCUMENTS

2010/0144486 A1* 6/2010 Hart et al. .................. 475/275
2012/0083381 A1* 4/2012 Wittkopp et al. ............ 475/275

FOREIGN PATENT DOCUMENTS

KR  101090813  12/2011
WO  0123777    4/2001

* cited by examiner

| | GEAR RATIO | STEP | STEP RATIO | CLUTCHES | | | BRAKES | | |
|---|---|---|---|---|---|---|---|---|---|
| | | | | 168 | 170 | 172 | 162 | 164 | 166 |
| 1F | 4.73 | 1F/10F | 6.86 | X | | | X | | X |
| 2F | 3.70 | 1F/2F | 1.28 | X | | | | X | X |
| 3F | 2.83 | 2F/3F | 1.31 | X | | | X | X | |
| 4F | 2.44 | 3F/4F | 1.16 | X | | X | | X | |
| 5F | 1.98 | 4F/5F | 1.23 | X | | X | X | | |
| 6F | 1.64 | 5F/6F | 1.21 | X | X | | | X | |
| 7F | 1.26 | 6F/7F | 1.30 | X | X | | X | | |
| 8F | 1.00 | 7F/8F | 1.26 | X | X | X | | | |
| 9F | 0.82 | 8F/9F | 1.22 | | X | X | X | | |
| 10F | 0.69 | 9F/10F | 1.19 | | X | | X | X | |
| 1R | -4.40 | 1R/1F | 0.93 | | | X | X | | X |
| ALTERNATE GEARS | | | | | | | | | |
| 9A | 0.79 | 9F/9A | 1.04 | | X | X | | X | |
| RA | -5.44 | RA/1F | 1.15 | | | X | | X | X |

FIG. 3A $\dfrac{N_{ring}}{N_{sun}}$  3.10   2.18   -3.10   2.23

FIG. 3B

|     | GEAR RATIO | STEP | STEP RATIO | CLUTCHES 268 | 270 | 272 | BRAKES 262 | 264 | 266 |
|-----|------------|------|------------|-----|-----|-----|-----|-----|-----|
| 1F  | 4.73 | 1F/10F | 6.86 | X |   |   | X |   | X |
| 2F  | 3.70 | 1F/2F  | 1.28 | X |   |   |   | X | X |
| 3F  | 2.83 | 2F/3F  | 1.31 | X |   |   | X | X |   |
| 4F  | 2.44 | 3F/4F  | 1.16 | X |   | X |   | X |   |
| 5F  | 1.98 | 4F/5F  | 1.23 | X |   | X | X |   |   |
| 6F  | 1.64 | 5F/6F  | 1.21 | X | X |   |   | X |   |
| 7F  | 1.26 | 6F/7F  | 1.30 | X | X |   | X |   |   |
| 8F  | 1.00 | 7F/8F  | 1.26 | X | X | X |   |   |   |
| 9F  | 0.82 | 8F/9F  | 1.22 |   | X | X | X |   |   |
| 10F | 0.69 | 9F/10F | 1.19 |   | X |   | X | X |   |
| 1R  | -4.40 | 1R/1F | 0.93 |   |   | X | X |   | X |
| ALTERNATE GEARS |||||||||||
| 9A  | 0.79 | 9F/9A | 1.04 |   | X | X |   | X |   |
| RA  | -5.44 | RA/1F | 1.15 |   |   | X |   | X | X |

|  | GEAR RATIO | STEP | STEP RATIO | CLUTCHES |  |  | BRAKES |  |  |
|---|---|---|---|---|---|---|---|---|---|
|  |  |  |  | 368 | 370 | 372 | 362 | 364 | 366 |
| 1F | 4.73 | 1F/10F | 6.86 | X |  |  | X |  | X |
| 2F | 3.70 | 1F/2F | 1.28 | X |  |  |  | X | X |
| 3F | 2.83 | 2F/3F | 1.31 | X |  |  | X | X |  |
| 4F | 2.44 | 3F/4F | 1.16 | X |  | X |  | X |  |
| 5F | 1.98 | 4F/5F | 1.23 | X |  | X | X |  |  |
| 6F | 1.64 | 5F/6F | 1.21 | X | X |  |  | X |  |
| 7F | 1.26 | 6F/7F | 1.30 | X | X |  | X |  |  |
| 8F | 1.00 | 7F/8F | 1.26 | X | X | X |  |  |  |
| 9F | 0.82 | 8F/9F | 1.22 |  | X | X | X |  |  |
| 10F | 0.69 | 9F/10F | 1.19 |  | X |  | X | X |  |
| 1R | -4.40 | 1R/1F | 0.93 |  |  | X | X |  | X |
| ALTERNATE GEARS |  |  |  |  |  |  |  |  |  |
| 9A | 0.79 | 9F/9A | 1.04 |  | X | X |  | X |  |
| RA | -5.44 | RA/1F | 1.15 |  |  | X |  | X | X |

|  | GEAR RATIO | STEP | STEP RATIO | CLUTCHES ||| BRAKES |||
|---|---|---|---|---|---|---|---|---|---|
|  |  |  |  | 468 | 470 | 472 | 462 | 464 | 466 |
| 1F | 4.73 | 1F/10F | 6.86 | X |  |  |  | X | X |
| 2F | 3.70 | 1F/2F | 1.28 | X |  |  | X |  | X |
| 3F | 2.83 | 2F/3F | 1.31 | X |  |  | X | X |  |
| 4F | 2.44 | 3F/4F | 1.16 | X |  | X | X |  |  |
| 5F | 1.98 | 4F/5F | 1.23 | X |  | X |  | X |  |
| 6F | 1.64 | 5F/6F | 1.21 | X | X |  | X |  |  |
| 7F | 1.26 | 6F/7F | 1.30 | X | X |  |  | X |  |
| 8F | 1.00 | 7F/8F | 1.26 | X | X | X |  |  |  |
| 9F | 0.82 | 8F/9F | 1.22 |  | X | X | X |  |  |
| 10F | 0.69 | 9F/10F | 1.19 |  | X |  | X | X |  |
| 1R | -4.40 | 1R/1F | 0.93 |  |  | X | X |  | X |
| ALTERNATE GEARS ||||||||||
| 8A | 0.81 | 8F/8A | 1.23 |  | X | X |  | X |  |
| RA | -3.06 | RA/1F | 0.65 |  |  | X |  | X | X |

MULTI-SPEED TRANSMISSION

TECHNICAL FIELD

The present disclosure is directed to transmissions used in vehicles and machines, and more particularly to multi-speed planetary-type transmissions.

BACKGROUND

Machines such as, for example, trucks, construction equipment, mining machines and the like, are used to perform many tasks. To effectively perform these tasks, the machines require a power source that provides significant power to a transmission. The power source may be an engine such as, for example, a diesel engine, a gasoline engine, a turbine engine, or a natural gas engine operated to generate a power output. The transmission may provide a range of gearing in order to allow the machine to work at several different speeds while keeping the engine within a desired operating range. Typically, the machines include a multi-speed transmission that generally includes a series of gears and is connected to the engine by a torque converter. The torque converter may assist with initial start up and further may provide a broader torque transmission range.

U.S. Pat. No. 7,828,690 to Wittkopp et al. discloses a multi-speed transmission in FIGS. 2a-2c having four planetary gear sets, three clutches, and three brakes to provide ten forward speed ratios and one reverse speed ratio. The input for the transmission is continuously connected to the ring rear of the first planetary gear set and the output is continuously connected to the planetary carrier of the fourth planetary gear set. The transmission disclosed by Wittkopp et al. provides a smaller overall gear ratio and a larger maximum step ratio than the transmission of the present disclosure.

U.S. Pat. No. 7,909,726 to Phillips et al. discloses a multi-speed transmission having four planetary gear sets, four clutches, and two brakes to provide ten forward speed ratios and one reverse speed ratio. The input for the transmission is continuously connected to the planetary carrier of the first planetary gear set and the output is continuously connected to the planetary carrier of the fourth planetary gear set. The transmission includes a continuous mechanical link between adjacent planetary gear sets (i.e. an element of the first planetary gear set is continuously linked to an element of the second planetary gear set, an element of the second planetary gear set is continuously linked to an element of the third planetary gear set, and an element of the third planetary gear set is continuously linked to an element of the fourth planetary gear set). The transmission disclosed by Phillips et al. provides a smaller overall gear ratio and a larger maximum step ratio than the transmission of the present disclosure.

SUMMARY OF THE INVENTION

In one embodiment of the present disclosure, a multi-speed transmission may include an input member and an output member disposed in a housing. A first planetary gear set, a second planetary gear set, a third planetary gear set, and a fourth planetary gear set, may be disposed within the housing, each planetary gear set including a sun gear, a planet carrier, and a ring gear. Six control elements may be operably coupled to each of the planetary gear sets and selectively engagable to create a set of different gear ratios between the input member and the output member. The set of different gear ratios may include at least ten forward gear ratios and at least one reverse gear ratio. The input member may be continuously connected to the sun gear of the first planetary gear set.

In another embodiment of the present disclosure, a multi-speed transmission may include an input member and an output member disposed in a housing. A first planetary gear set, a second planetary gear set, a third planetary gear set, and a fourth planetary gear set, may be disposed within the housing, each planetary gear set including a sun gear, a planetary carrier, and a ring gear. Six control elements may be operably coupled to each of the planetary gear sets and selectively engagable to create a set of different gear ratios including at least ten forward gear ratios and at least one reverse gear ratio. The output member may be continuously connected to the ring gear of the fourth planetary gear set.

In another embodiment of the present disclosure, a multi-speed transmission may include an input member and an output member disposed in a housing. A first planetary gear set, a second planetary gear set, a third planetary gear set, and a fourth planetary gear set, may be disposed within the housing and each planetary gear set including a sun gear, a planetary carrier, and a ring gear. The multi-speed transmission may include no more than six control elements, with at least one control element operably coupled to each of the planetary gear sets. The control elements being selectively engagable to create a set of different gear ratios including at least ten forward gear ratios and at least one reverse gear ratio. The input member may be continuously connected to the sun gear of the first planetary gear set and the output member may be continuously connected to the ring gear of the fourth planetary gear set.

DETAILED DESCRIPTION

Figure 1:
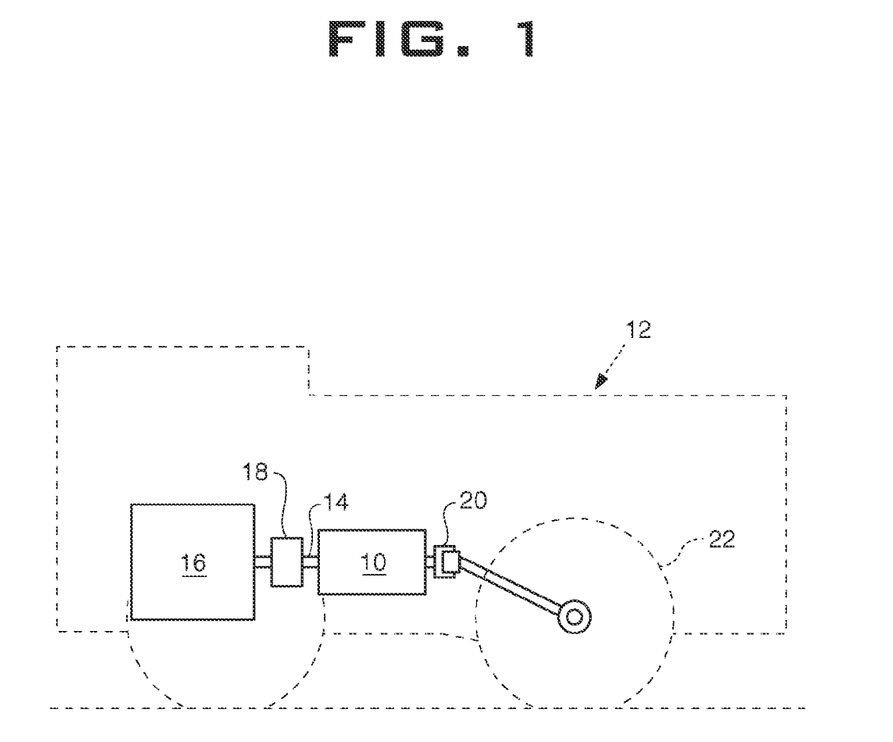
FIG. 1 is a diagrammatic illustration of a machine including a multi-speed transmission in accordance with one embodiment of the present disclosure.

Referring to FIG. 1, a multi-speed transmission 10 is included in a machine 12. An input member 14 connects the transmission 10 to a power source 16 by a torque converter 18, and an output member 20 connects the transmission 10 to one or more traction devices 22. Although the machine 12 is shown as a truck, it may be any type of machine that may benefit from the use of a multi-speed transmission. The power source 16 may be of any type that outputs power in a form usable by the multi-speed transmission 10. For example, the power source 16 may be an internal combustion engine (such as a diesel engine, a gasoline engine, a turbine engine or a natural gas engine), an electric motor, or other device capable of generating a power output. The traction devices 22 may be any type of traction devices, such as, for example, wheels as shown in FIG. 1, tracks, belts, or any combinations thereof.

Figure 2A:
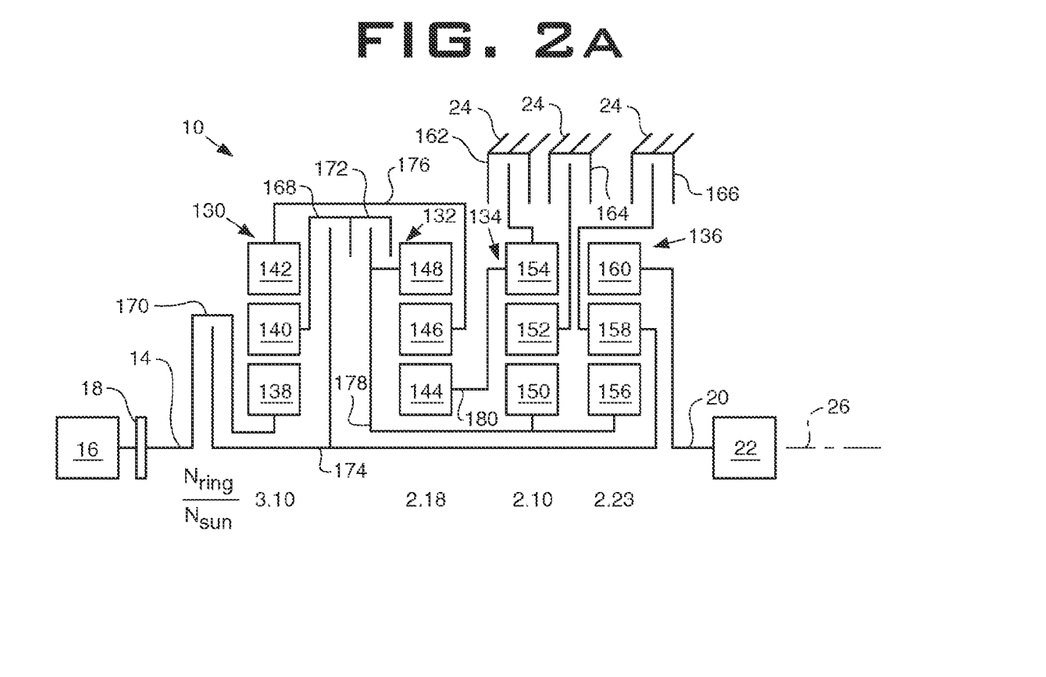
FIG. 2A is a schematic illustration of a transmission in accordance with a first embodiment of the present disclosure.

FIG. 2A schematically illustrates an embodiment of a transmission 10 in accordance with the present disclosure. Transmission 10 may include a stationary housing 24. Four planetary gear sets may be rotatably supported and aligned about a rotational axis 26 and disposed within the housing 24. The transmission 10 may further include a plurality of control elements, such as clutches and brakes, configured to selectively engage the housing 24, the planetary gear sets, or other transmission components such as shafts. The structure of the gears, control elements, input members, output members, coupling members, and the connections therebetween may be achieved using conventional components.

As will be explained in more detail in connection with the embodiments of this disclosure, a planetary gear set may include at least one sun gear, at least one planetary carrier including a plurality of planet gears, and a ring gear. In a simple or single-orbit planetary gear set having single set of planet gears, the planet gears of the planetary carrier mesh with the sun gear and the ring gear. A double-pinion or double-orbit planetary gear set has a first or inner set of planet gears and a second or outer set of planet gears, and therefore the inner planet gears mesh with the sun gear and the outer planet gears, while the outer planet gears mesh with the inner planet gears and the ring gear. As used herein, the term "planetary gear set" includes single orbit, double orbit, or other known types of planetary gear sets.

The sun gear, planetary carrier, planet gears, and ring gear may all rotate together simultaneously. Alternately, each of the sun gear, planetary carrier, and ring gear may be held stationary. The planetary gear set receives an input rotation at a first speed and generates a corresponding output rotation at a second speed. The change in rotational speed between the input and the output depends upon the number of teeth in the sun gear, the plurality of planet gears (if multiple planet gear sets) mounted to the planet carrier, and the ring gear. The change in rotational speed also depends upon the particular gear that is used to receive the input rotation, the particular gear that is selected to provide the output rotation, and the particular gear that, if any, is held stationary.

The embodiment of the multi-speed transmission 10 illustrated in FIG. 2A may include a first planetary gear set 130, a second planetary gear set 132, a third planetary gear set 134, and a fourth planetary gear set 136, which are arranged in sequential order in an axial direction or the direction of power flow along axis 26. Each planetary gear set includes at least one sun gear, at least one planetary carrier, and at least one ring gear. Accordingly, the first planetary gear set 130 includes a first sun gear 138, a first planetary carrier 140, and a first ring gear 142. The second planetary gear set 132 includes a second sun gear 144, a second planetary carrier 146, and a second ring gear 148. The third planetary gear set 134 includes a third sun gear 150, a third planetary carrier 152, and a third ring gear 154. Finally, the fourth planetary gear set 136 includes a fourth sun gear 156, a fourth planetary carrier 158, and a fourth ring gear 160.

The transmission 10 may also include six control elements operatively coupled to the planetary gear sets 130, 132, 134, 136 and selectively engageable to create a set of different gear ratios between the input member 14 and the output member 20. As used herein, the term "control element" includes clutches (which are alternatively referred to in the industry as rotational clutches), brakes (which are alternatively referred to in the industry as stationary clutches), synchronizers (including dog and other types of synchronizing clutches) or other torque control components that may conventionally be used in a transmission. In the embodiment of FIG. 2A, the transmission 10 includes a first brake 162, a second brake 164, and a third brake 166, each including components thereof connected to the stationary housing 24. Additionally, the transmission 10 includes a first clutch 168, a second clutch 170, and a third clutch 172, each of which may be connected between rotatable components of the transmission 10.

The transmission 10 may further include a plurality of intermediate coupling members connecting components of the planetary gear sets to control elements or components of other planetary gear sets. As illustrated in FIG. 2A, the transmission 10 includes a first intermediate coupling member 174, a second intermediate coupling member 176, a third intermediate coupling member 178, and a fourth intermediate coupling member 180.

The components of the transmission 10 may be connected to obtain ten forward speeds, or gear ratios, and one reverse gear ratio. As shown in FIG. 2A, the input member 14 may be continuously connected to the first sun gear 138. The first intermediate coupling member 174 may be selectively connected to the first sun gear 138 by the second clutch 170, selectively connected to the first planet carrier 140 by first clutch 168, and continuously connected to the fourth planetary carrier 158. The fourth planetary carrier 158 may be further selectively connected to the housing 24 by the third brake 166. The second intermediate coupling member 176 may be continuously connected to the first ring gear 142 and continuously connected to the second planetary carrier 146. The third intermediate coupling member 178 may be selectively connected to the first planetary carrier 140 by third clutch 172, continuously connected to the second ring gear 148, continuously connected to the third sun gear 150, and continuously connected to the fourth sun gear 156. The fourth intermediate coupling member 180 may be continuously connected to the second sun gear 144 and continuously connected to the third ring gear 154. The third ring gear 154 may be further selectively connected to the housing 24 by the first brake 162. The third planetary carrier 152 may be selectively connected to the housing 24 by the second brake 164. The output member 20 may be continuously connected to the fourth ring gear 160.

In this configuration shown in FIG. 2A, the ratio ($N_{ring}/N_{sun}$) of the first planetary gear set 130 may be 3.10. The ratio of the second planetary gear set 132 may be 2.18. The ratio of the third planetary gear set 134 may be 2.10. The ratio of the fourth planetary gear set 136 may be 2.23.

Figure 2B:
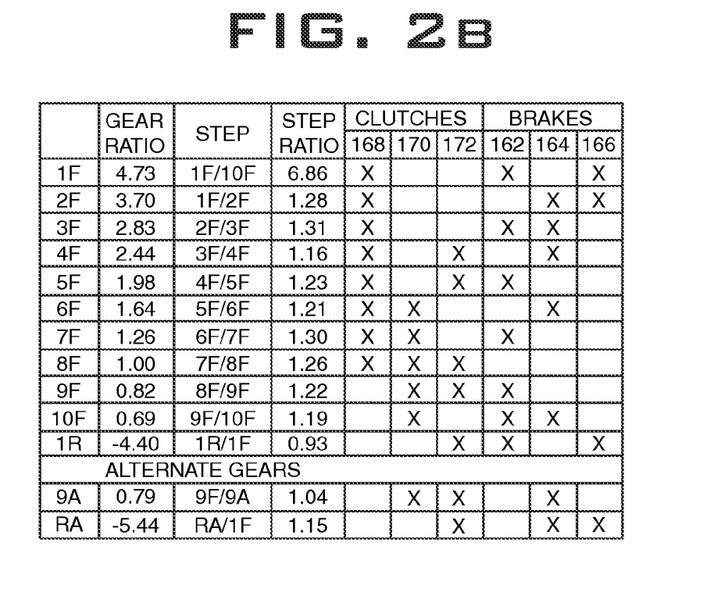
FIG. 2B is a truth table identifying the engaged control elements, ratio reductions, and step ratios for each gear provided by the transmission of FIG. 2A.

FIG. 2B shows a truth table depicting, by the symbol "X", the selective engagement combinations of the brakes 162, 164, 166 and the clutches 168, 170, 172 which establish ten forward speed ratios and one reverse speed ratio between the input member 14 and the output member 20 by way of the planetary gear sets 132, 134, 136, and 138, of the embodiment of the multi-speed transmission 10 of FIG. 2A.

Figure 3A:
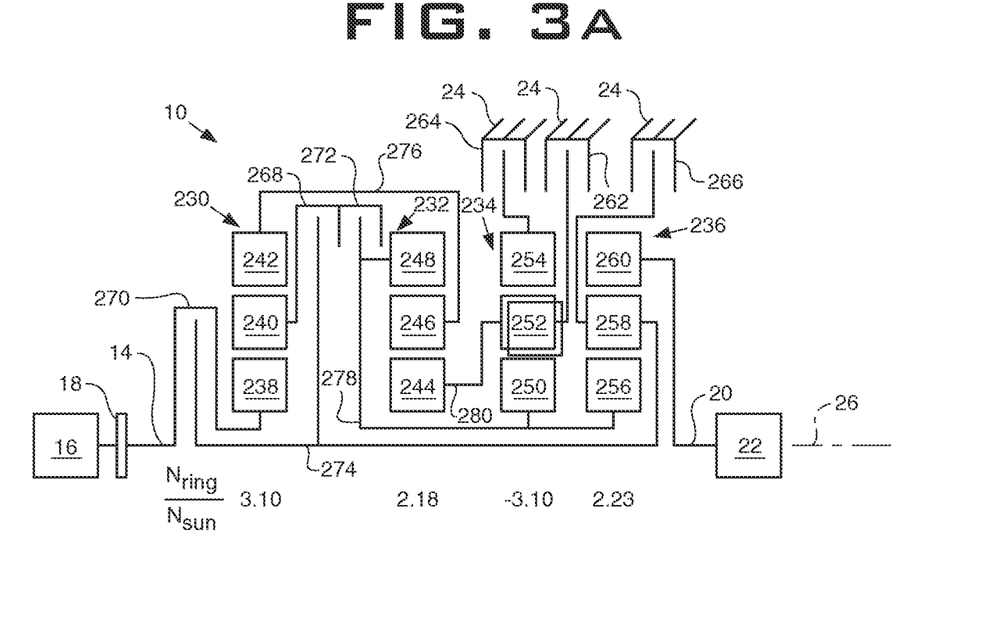
FIG. 3A is a schematic illustration of a transmission in accordance with a second embodiment of the present disclosure.

A second embodiment of the multi-speed transmission 10 of the present disclosure, as shown in FIG. 3A, may include a first planetary gear set 230, a second planetary gear set 232, a third planetary gear set 234, and a fourth planetary gear set 236, which are arranged in sequential order in an axial direction or the direction of power flow along axis 26. Each planetary gear set includes at least one sun gear, at least one planet carrier, and at least one ring gear. Accordingly, the first planetary gear set 230 includes a first sun gear 238, a first planetary carrier 240, and a first ring gear 242. The second planetary gear set 232 includes a second sun gear 244, a second planetary carrier 246, and a second ring gear 248. The third planetary gear set 234 includes a third sun gear 250, a third planetary carrier 252, and a third ring gear 254. Finally, the fourth planetary gear set 236 includes a fourth sun gear 256, a fourth planetary carrier 258, and a fourth ring gear 260. In this embodiment, the third planetary gear set 234 may be configured to include a double-orbit planetary carrier 252.

The embodiment of the transmission 10 shown in FIG. 3A may also include six control elements operatively coupled to the planetary gear sets 230, 232, 234, 236 and selectively engageable to create a set of different gear ratios between the input member 14 and the output member 20. The transmission 10 may include a first brake 262, a second brake 264, and a third brake 266, each including components thereof connected to the stationary housing 24. Additionally, the transmission 10 includes a first clutch 268, a second clutch 270, and a third clutch 272, each of which may be connected between rotatable components of the transmission 10.

The transmission 10 may further include a plurality of intermediate coupling members connecting components of the planetary gear sets to control elements or components of other planetary gear sets. As illustrated in FIG. 3A, the transmission 10 includes a first intermediate coupling member 274, a second intermediate coupling member 276, a third intermediate coupling member 278, and a fourth intermediate coupling member 280.

The components of the transmission 10 may be connected to obtain ten forward speeds, or gear ratios, and one reverse gear ratio. As shown in FIG. 3A, the input member 14 may be continuously connected to the first sun gear 238. The first intermediate coupling member 274 may be selectively connected to the first sun gear 238 by the second clutch 270, selectively connected to the first planetary carrier 240 by the first clutch 268, and continuously connected to the fourth planetary carrier 258. The fourth planetary carrier 258 may be further selectively connected to the housing 24 by the third brake 266. The second intermediate coupling member 276 may be continuously connected to the first ring gear 242 and continuously connected to the second planetary carrier 246. The third intermediate coupling member 278 may be selectively connected to the first planetary carrier 240 by the third clutch 272, continuously connected to the second ring gear 248, continuously connected to the third sun gear 250 and continuously connected to the fourth sun gear 256. The fourth intermediate coupling member 280 may be continuously connected to the second sun gear 244 and continuously connected to the third planetary carrier 252. Further, the third ring gear 254 may be selectively connected to the housing 24 by the second brake 264. The third planetary carrier 252 may be selectively connected to the housing 24 by the first brake 262. The output member 20 may be continuously connected to the fourth ring gear 260.

In this configuration shown in FIG. 3A, the ratio ($N_{ring}/N_{sun}$) of the first planetary gear set 230 may be 3.10. The ratio of the second planetary gear set 232 may be 2.18. The ratio of the third planetary gear set 234 may be −3.10. The ratio of the fourth planetary gear set 236 may be 2.23.

Figure 3B:
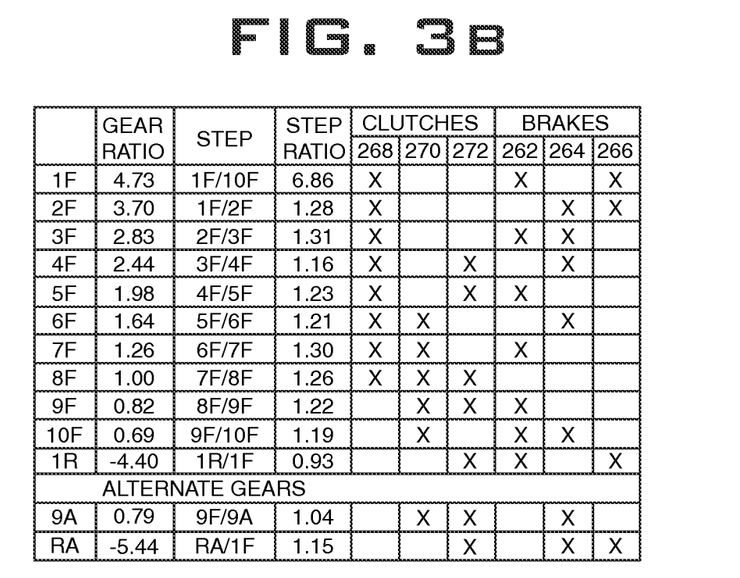
FIG. 3B is a truth table identifying the engaged control elements, ratio reductions, and step ratios for each gear provided by the transmission of FIG. 3A.

FIG. 3B shows a truth table depicting, by the symbol "X", the engagement combinations of the brakes 262, 264, 266 and the clutches 268, 270, 272 which establish ten forward speed ratios and one reverse speed ratio between the input member 14 and the output member 20 by way of the planetary gear sets 232, 234, 236, and 238, of the embodiment of the multi-speed transmission 10 of FIG. 3A.

Figure 4A:
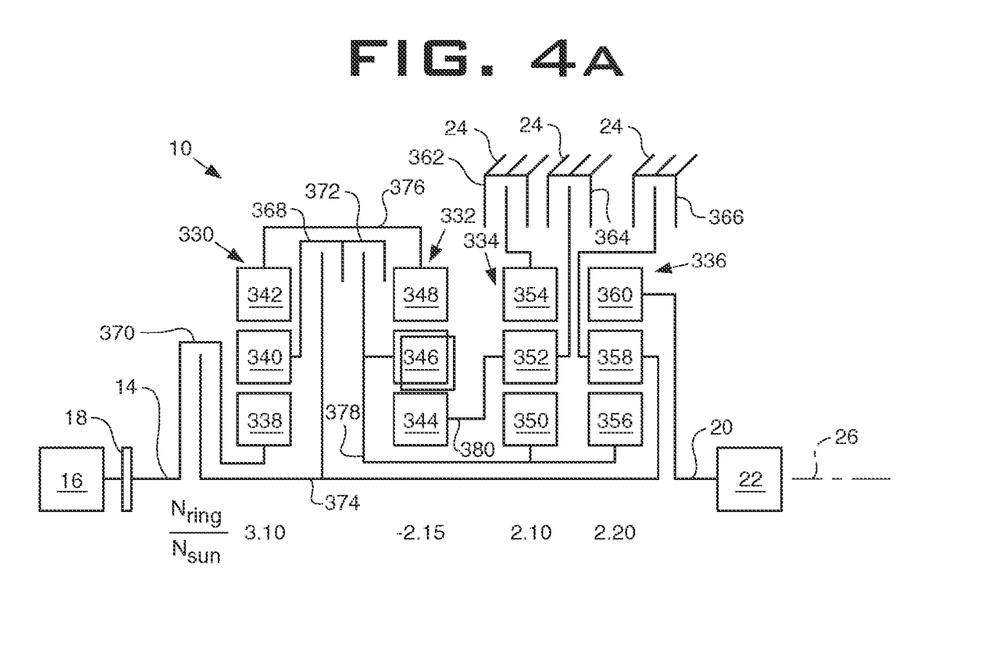
FIG. 4A is a schematic illustration of a transmission in accordance with a third embodiment of the present disclosure.

A third embodiment of the multi-speed transmission 10 of the present disclosure, as shown in FIG. 4A, includes a first planetary gear set 330, a second planetary gear set 332, a third planetary gear set 334, and a fourth planetary gear set 336, which are arranged in sequential order in an axial direction or the direction of power flow along axis 26. Each planetary gear set includes at least one sun gear, at least one planetary carrier, and at least one ring gear. Accordingly, the first planetary gear set 330 includes a first sun gear 338, a first planetary carrier 340, and a first ring gear 342. The second planetary gear set 332 includes a second sun gear 344, a second planetary carrier 346, and a ring gear 348. The third planetary gear set 334 includes a third sun gear 350, a third planet carrier 352, and a third ring gear 354. Finally, the fourth planetary gear set 336 includes a fourth sun gear 356, a fourth planet carrier 358, and a fourth ring gear 360. In this embodiment, the second planetary gear set 332 may be configured to include a double-orbit planetary carrier 346.

The embodiment of the transmission 10 shown in FIG. 4A may also include six control elements operatively coupled to the planetary gear sets 330, 332, 334, 336 and selectively engageable to create a set of different gear ratios between the input member 14 and the output member 20. The transmission 10 may include a first brake 362, a second brake 364, and a third brake 366, each including components thereof connected to the stationary housing 24. Additionally, the transmission 10 may include a first clutch 368, a second clutch 370, and a third clutch 372, each of which may be connected between rotatable components of the transmission 10.

The transmission 10 may further include a plurality of intermediate coupling members connecting components of the planetary gear sets to control elements or components of other planetary gear sets. As illustrated in FIG. 4A, the transmission 10 may include a first intermediate coupling member 374, a second intermediate coupling member 376, a third intermediate coupling member 378, and a fourth intermediate coupling member 380.

The components of the transmission 10 may be connected to obtain ten forward speeds, or gear ratios, and one reverse gear ratio. As shown in FIG. 4A, the input member 14 may be continuously connected to the first sun gear 338. The first intermediate coupling member 374 may be selectively connected to the first sun gear 338 by the second clutch 370, selectively connected to the first planetary carrier 340 by the first clutch 368, and continuously connected to the fourth planetary carrier 358. The fourth planetary carrier 358 may be further selectively connected to the housing 24 by the third brake 366. The second intermediate coupling member 376 may be continuously connected to the first ring gear 342 and continuously connected to the second ring gear 348. The third intermediate coupling member 378 may be selectively connected to the first planetary carrier 340 by the third clutch 372, continuously connected to the second planetary carrier 346, continuously connected to the third sun gear 350, and continuously connected to the fourth sun gear 356. The fourth intermediate coupling member 380 may be continuously connected to the second sun gear 344 and continuously connected to the third planetary carrier 352. Further, the third ring gear 354 may be selectively connected to the housing 24 by the first brake 362. The third planetary carrier 352 may be selectively connected to the housing 24 by the second brake 364. The output member 20 may be continuously connected to the fourth ring gear 360.

In this configuration shown in FIG. 4A, the ratio ($N_{ring}/N_{sun}$) of the first planetary gear set 330 may be 3.10. The ratio of the second planetary gear set 332 may be −2.15. The ratio of the third planetary gear set 334 may be 2.10. The ratio of the fourth planetary gear set 336 may be 2.20.

Figure 4B:
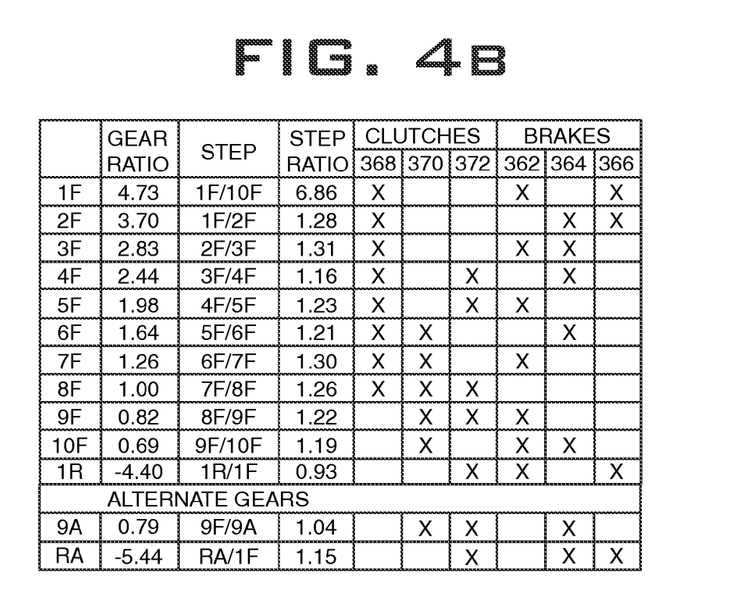
FIG. 4B is a truth table identifying the engaged control elements, ratio reductions, and step ratios for each gear provided by the transmission of FIG. 4A.

FIG. 4B shows a truth table depicting, by the symbol "X", the engagement combinations of the brakes 362, 364, 366 and the clutches 368, 370, 372 which establish ten forward speed ratios and one reverse speed ratio between the input member 14 and the output member 20 by way of the planetary gear sets 332, 334, 336, and 338 of the embodiment of the multi-speed transmission 10 of FIG. 4A.

Figure 5A:
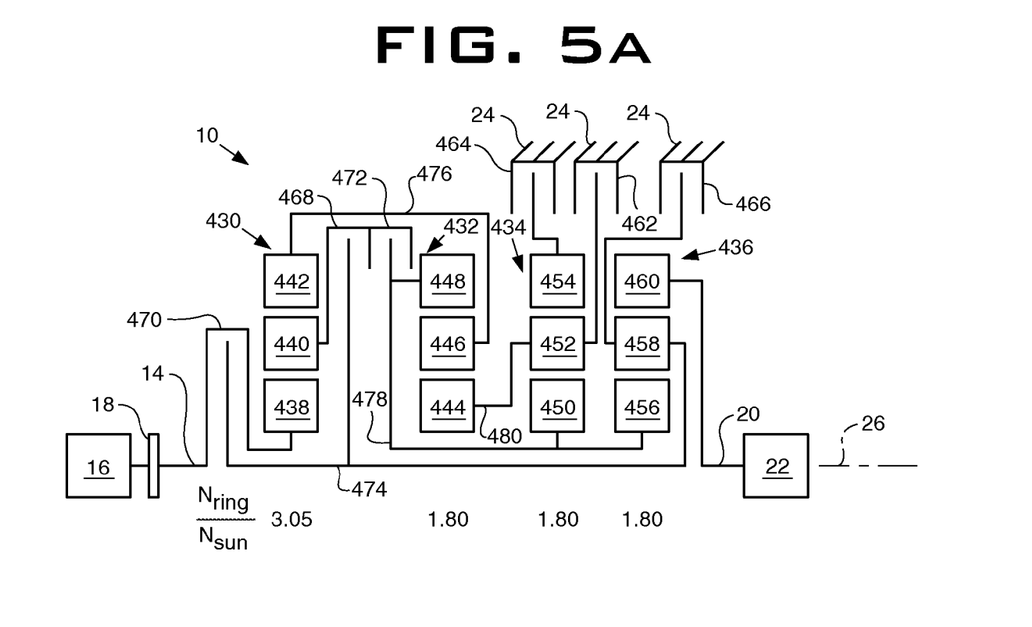
FIG. 5A is a schematic illustration of a transmission in accordance with a fourth embodiment of the present disclosure.

A fourth embodiment of the multi-speed transmission 10 of the present disclosure, as shown in FIG. 5A, may include a first planetary gear set 430, a second planetary gear set 432, a third planetary gear set 434, and a fourth planetary gear set 436, which are arranged in sequential order in an axial direction or the direction of power flow along axis 26. Each planetary gear set includes at least one sun gear, at least one planet carrier, and at least one ring gear. Accordingly, the first planetary gear set 430 includes a first sun gear 438, a first planetary carrier 440, and a first ring gear 442. The second planetary gear set 432 includes a second sun gear 444, a second planetary carrier 446, and a second ring gear 448. The third planetary gear set 434 includes a third sun gear 450, a third planetary carrier 452, and a third ring gear 454. Finally, the fourth planetary gear set 436 includes a fourth sun gear 456, a fourth planet carrier 458, and a fourth ring gear 460.

The embodiment of the transmission 10 shown in FIG. 5A may also include six control elements operatively coupled to the planetary gear sets 430, 432, 434, 436 and selectively engageable to create a set of different gear ratios between the input member 14 and the output member 20. The transmission 10 includes a first brake 462, a second brake 464, and a third brake 466, having components thereof connected to the stationary housing 24. Additionally, the transmission 10 includes a first clutch 468, a second clutch 470, and a third clutch 472, each of which may be connected between rotatable components of the transmission 10.

The transmission 10 may further include a plurality of intermediate coupling members connecting components of the planetary gear sets to control elements or components of other planetary gear sets. As illustrated in FIG. 5A, the transmission 10 includes a first intermediate coupling member 474, a second intermediate coupling member 476, a third intermediate coupling member 478, and a fourth intermediate coupling member 480.

The components of the transmission 10 may be connected to obtain ten forward speeds, or gear ratios, and one reverse gear ratio. As shown in FIG. 5A, the input member 14 may be continuously connected to the first sun gear 438. The first intermediate coupling member 474 may be selectively connected to the first sun gear 438 by the second clutch 470, selectively connected to the first planetary carrier 440 by the first clutch 468, and continuously connected to the fourth planetary carrier 458. The fourth planetary carrier 458 may be further selectively connected to the housing 24 by the third brake 466. The second intermediate coupling member 476 may be continuously connected to the first ring gear 442 and continuously connected to the second planetary carrier 446. The third intermediate coupling member 478 may be continuously connected to the second ring gear 448, continuously connected to the third sun gear 450, and continuously connected to the fourth sun gear 456. The fourth intermediate coupling member 480 may be continuously connected to the second sun gear 444 and continuously connected to the third planetary carrier 452. Further, the third planetary carrier 452 may be selectively connected to the housing 24 by the first brake 462. The third ring gear 454 may be selectively connected to the housing 24 by the second brake 464. The output member 20 may be continuously connected to the fourth ring gear 460.

In this configuration shown in FIG. 5A, the ratio ($N_{ring}/N_{sun}$) of the first planetary gear set 430 may be 3.05. The ratio of the second planetary gear set 432 may be 1.80. The ratio of the third planetary gear set 434 may be 1.80. The ratio of the fourth planetary gear set 436 may be 1.80.

Figure 5B:
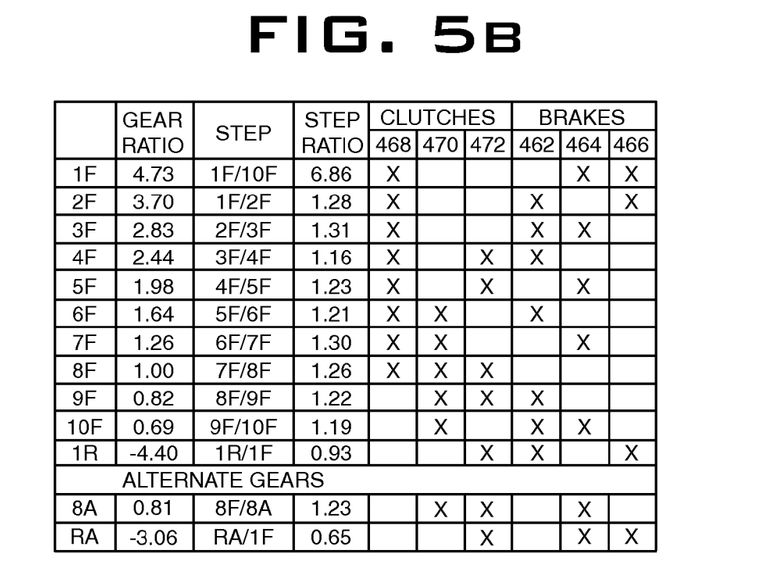
FIG. 5B is a truth table identifying the engaged control elements, ratio reductions, and step ratios for each gear provided by the transmission of FIG. 5A.

FIG. 5B shows a truth table depicting, by the symbol "X", the engagement combinations of the brakes 462, 464, 466 and the clutches 468, 470, 472 which establish ten forward speed ratios and one reverse speed ratio between the input member 14 and the output member 20 by way of the planetary gear sets 432, 434, 436, and 438, of the embodiment of the multi-speed transmission 10 of FIG. 5A.

Figure 6A:
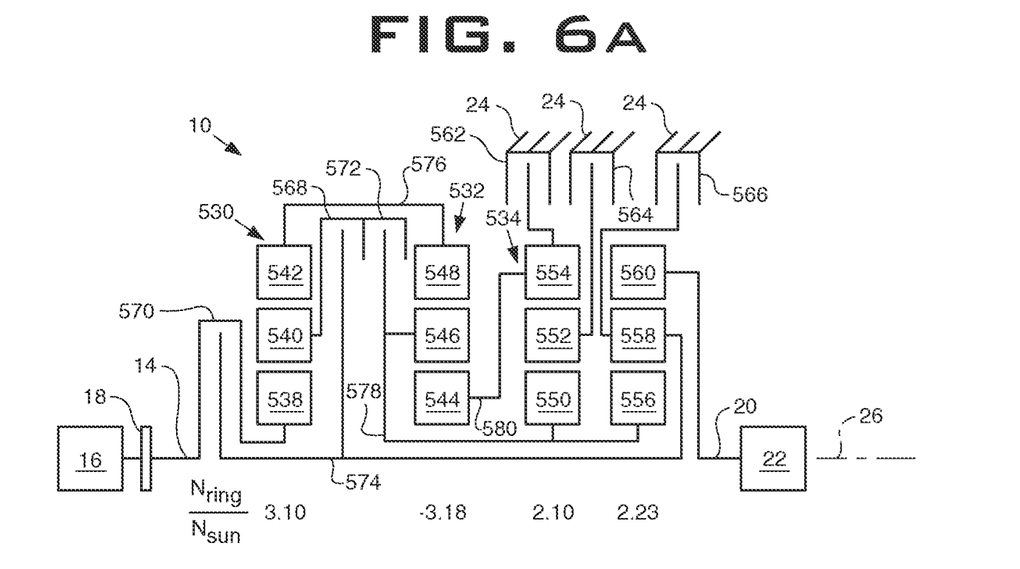
FIG. 6A is a schematic illustration of a transmission in accordance with a fifth embodiment of the present disclosure.

A fifth embodiment of the multi-speed transmission 10 of the present disclosure, as shown in FIG. 6A, includes a first planetary gear set 530, a second planetary gear set 532, a third planetary gear set 534, and a fourth planetary gear set 536, which are arranged in sequential order in an axial direction or the direction of power flow along axis 26. Each planetary gear set includes at least one sun gear, at least one planetary carrier, and at least one ring gear. Accordingly, the first planetary gear set 530 includes a first sun gear 538, a first planetary carrier 540, and a first ring gear 542. The second planetary gear set 532 includes a second sun gear 544, a second planetary carrier 546, and a ring gear 548. The third planetary gear set 534 includes a third sun gear 550, a third planet carrier 552, and a third ring gear 554. Finally, the fourth planetary gear set 536 includes a fourth sun gear 556, a fourth planet carrier 558, and a fourth ring gear 560. In this embodiment, the second planetary gear set 532 may be configured to include a double-orbit planetary carrier 546.

The embodiment of the transmission 10 shown in FIG. 6A may also include six control elements operatively coupled to the planetary gear sets 530, 532, 534, 536 and selectively engageable to create a set of different gear ratios between the input member 14 and the output member 20. The transmission 10 may include a first brake 562, a second brake 564, and a third brake 566, each including components thereof connected to the stationary housing 24. Additionally, the transmission 10 may include a first clutch 568, a second clutch 570, and a third clutch 572, each of which may be connected between rotatable components of the transmission 10.

The transmission 10 may further include a plurality of intermediate coupling members connecting components of the planetary gear sets to control elements or components of other planetary gear sets. As illustrated in FIG. 6A, the transmission 10 may include a first intermediate coupling member 574, a second intermediate coupling member 576, a third intermediate coupling member 578, and a fourth intermediate coupling member 580.

The components of the transmission 10 may be connected to obtain ten forward speeds, or gear ratios, and one reverse gear ratio. As shown in FIG. 6A, the input member 14 may be continuously connected to the first sun gear 538. The first intermediate coupling member 574 may be selectively connected to the first sun gear 538 by the second clutch 570, selectively connected to the first planetary carrier 540 by the first clutch 568, and continuously connected to the fourth planetary carrier 558. The fourth planetary carrier 558 may be further selectively connected to the housing 24 by the third brake 566. The second intermediate coupling member 576 may be continuously connected to the first ring gear 542 and continuously connected to the second ring gear 548. The third intermediate coupling member 578 may be selectively connected to the first planetary carrier 540 by the third clutch 572, continuously connected to the second planetary carrier 546, continuously connected to the third sun gear 550, and continuously connected to the fourth sun gear 556. The fourth intermediate coupling member 580 may be continuously connected to the second sun gear 544 and continuously connected to the third ring gear 554. Further, the third planetary carrier 552 may be selectively connected to the housing 24 by the second brake 564. The third ring gear 554 may be selectively connected to the housing 24 by the first brake 562. The output member 20 may be continuously connected to the fourth ring gear 5360.

In this configuration shown in FIG. 4A, the ratio ($N_{ring}/N_{sun}$) of the first planetary gear set 530 may be 3.10. The ratio of the second planetary gear set 532 may be −3.18. The ratio of the third planetary gear set 534 may be 2.10. The ratio of the fourth planetary gear set 536 may be 2.23.

Figure 6B:
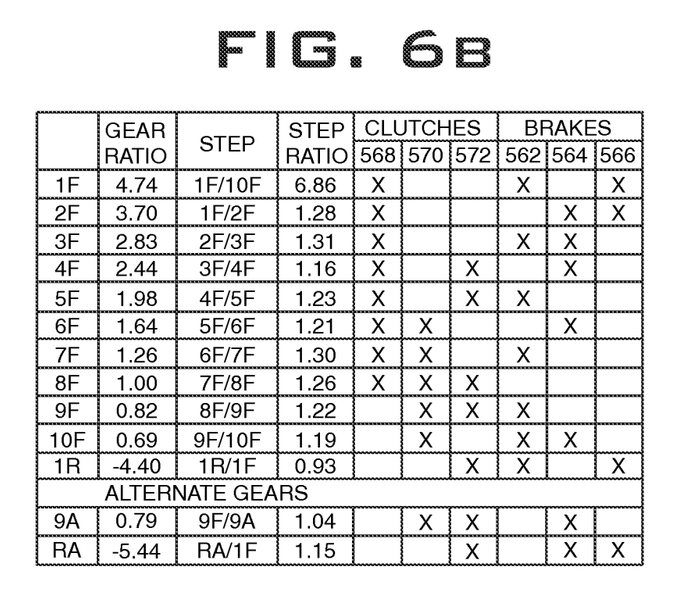
FIG. 6B is a truth table identifying the engaged control elements, ratio reductions, and step ratios for each gear provided by the transmission of FIG. 6A.

FIG. 6B shows a truth table depicting, by the symbol "X", the engagement combinations of the brakes 562, 564, 566 and the clutches 568, 570, 572 which establish ten forward speed ratios and one reverse speed ratio between the input member 14 and the output member 20 by way of the planetary gear sets 532, 534, 536, and 538 of the embodiment of the multi-speed transmission 10 of FIG. 6A.

INDUSTRIAL APPLICABILITY

While the foregoing transmission embodiments may be used in any machine having a multi-speed transmission, they have particular applicability in trucks and other heavy construction and mining machines. Such machines have specific gearing requirements that the disclosed transmission is capable of meeting, while allowing an engine of the machine to remain within a desired operating range.

For the purposes of the present disclosure, the term "desired operating range" includes those speeds and torques at which the engine experiences substantially stable and efficient operation. When operating outside the desired operating range, the engine may experience unstable operation such as, for example, over speed situations, under speed situations, lugging, and/or stalling. Efficiency losses may also be experienced by the engine when operating outside the desired operating range such as, for example, increased fuel consumption, increased exhaust emissions, increased engine temperatures, and/or decreased responsiveness.

The transmission embodiments disclosed herein include a plurality of planetary gear assemblies and clutch arrangements that provide relatively uniform and closely spaced speed intervals that enhance performance and shift quality. The availability of ten forward gears may advantageously allow constant or nearly constant step ratios between shifts (referring to FIGS. 2B, 3B, 4B, and 5B), which become apparent when compared with earlier transmissions of fewer gears or of varying step ratios. When the torque converter is in direct drive mode (i.e., when a torque converter lock-up clutch is engaged) the evenly-spaced step ratios between the transmission speed reductions may produce nearly constant utilization approaching the peak input power, with only minor deviations from the peak input power. Deviations from peak power utilization may result in machine inefficiency. Producing nearly constant utilization of peak input power ensures that the most efficient part of each drive ratio is fully utilized. The output speed of the engine (input speed of the transmission) may also be kept within a substantially narrow desired operating range, thereby resulting in efficient operation of the machine.

Reference will now be made to the operation of the embodiment of the multi-speed transmission 10 as set forth in the truth table of FIG. 2B, in which the symbol "X" denotes selective engagement of a particular control element. During operation of the machine, it is desirable to select a number of speeds or gear ratios to match the power output of the engine to a given load condition. Selection of the gear ratios may be made manually or automatically.

FIG. 2B depicts the truth table for the embodiment of the multi-speed transmission 10 is shown in FIG. 2A. FIG. 2B indicates that a first forward speed or gear may be selected by engaging the first clutch 168 to connect the first planet carrier 140 to the fourth planet carrier 158 by first intermediate coupling member 174. Simultaneously, the first brake 162 is engaged to connect the third ring gear 154 and the second sun gear 144 through intermediate coupling 180 to the stationary housing 24 and the third brake 166 is engaged to connect the fourth planet carrier 158 to the housing 24. The gear ratio associated with this first forward gear configuration provides a first forward gear ratio of approximately 4.73.

A shift to a second forward gear from the first forward gear may be accomplished by disengaging the first brake 162 and thereby disconnecting the third ring gear 154 and the second sun gear 144 through intermediate coupling 180 from the housing 24, maintaining engagement of the first clutch 168 and the third brake 166, and further engaging the second brake 164 to connect the third planetary carrier 152 to the housing 24. The second forward gear ratio in this configuration may be approximately 3.70. The step ratio from the first forward gear to the second forward gear in this configuration may be approximately 1.28.

A shift to a third forward gear from the second forward gear may be accomplished by disengaging the third brake 166 and thereby disconnecting the fourth planetary carrier 158 from the housing 24, maintaining engagement of the first clutch 168 and the second brake 164, and further engaging the first brake 162 to connect the third ring gear 154 and the second sun gear 144 through intermediate coupling 180 to the housing 24. The third forward gear ratio in this configuration may be approximately 2.83. The step ratio from the second forward gear to the third forward gear in this configuration may be approximately 1.31.

A shift to a fourth forward gear from the third forward gear may be accomplished by disengaging the first brake 162 and thereby disconnecting the third ring gear 154 and the second sun gear 144 through intermediate coupling 180 from the housing 24, maintaining engagement of the first clutch 168 and the second brake 164, and further engaging the third clutch 172 to connect the first planetary carrier 140 to the second ring gear 148 and to the third sun gear 150 and the fourth sun gear 156 through intermediate coupling member 178. The fourth forward gear ratio in this configuration may be approximately 2.44. The step ratio from the third forward gear to the fourth forward gear in this configuration may be approximately 1.16.

A shift to a fifth forward gear from the fourth forward gear may be accomplished by disengaging the second brake 164 and thereby disconnecting the third planetary carrier 152 from the housing 24, maintaining engagement of the first clutch 168 and the third clutch 172, and further engaging the first brake 162 to connect the third ring gear 154 and the second sun gear 144 through intermediate coupling 180 to the housing 24. The fifth forward gear ratio in this configuration may be approximately 1.98. The step ratio from the fourth forward gear to the fifth forward gear in this configuration may be approximately 1.23.

A shift to a sixth forward gear from the fifth forward gear may be accomplished by disengaging the third clutch 172 and the first brake 162 thereby disconnecting the first planetary carrier 140 from the second ring gear 148 and the third intermediate coupling member 178 and disconnecting the third ring gear 154 and the second sun gear 144 through intermediate coupling 180 from the housing 24, maintaining engagement of the first clutch 168, and further engaging the second clutch 170 to simultaneously connect the first sun gear 138 to the first planetary carrier 140 and to the fourth planetary carrier 158, and engaging the second brake 164 to connect the third planet carrier 152 to the housing 24. The sixth forward gear ratio in this configuration may be approximately 1.64. The step ratio from the fifth forward gear to the sixth forward gear in this configuration may be approximately 1.21.

A shift to a seventh forward gear from the sixth forward gear may be accomplished by disengaging the second brake 164 and thereby disconnecting the third planetary carrier 152 from the housing 24, maintaining engagement of the first clutch 168 and the second clutch 170, and further engaging the first brake 162 to connect the third ring gear 154 and the second sun gear 144 through intermediate coupling 180 to the housing 24. The seventh forward gear ratio in this configuration may be 1.26. The step ratio from the sixth forward gear to the seventh forward gear in this configuration may be approximately 1.30.

A shift to an eighth forward gear from the seventh forward gear may be accomplished by disengaging the first brake 162 and thereby disconnecting the third ring gear 154 and the second sun gear 144 through intermediate coupling 180 from the housing 24, maintaining engagement of the first clutch 168 and the second clutch 170, and further engaging the third clutch 172 to connect the first planetary carrier 140 to the second ring gear 148 and to the third sun gear 150, and to the fourth sun gear 156 by the third intermediate coupling member 178. The eighth forward gear ratio in this configuration may be approximately 1.00. The step ratio from the seventh forward gear to the eighth forward gear in this configuration may be approximately 1.26.

A shift to a ninth forward gear from the eighth forward gear may be accomplished by disengaging the first clutch 168 and thereby disconnecting the first planetary carrier 140 from the fourth planetary carrier, maintaining engagement second clutch 170 and the third clutch 172, and further engaging the first brake 162 to connect the third ring gear 154 and the second sun gear 144 through intermediate coupling 180 to the housing 24. The ninth forward gear ratio in this configuration may be approximately 0.82. The step ratio from the eighth forward gear to the ninth forward gear in this configuration may be approximately 1.22.

A shift to a tenth forward gear from the ninth forward gear may be accomplished by disengaging the third clutch 172 and disconnecting the first planetary carrier 140 from the second ring gear 148 and the third intermediate coupling member 178, maintaining engagement of the second clutch 170 and the first brake 162, and further engaging the second brake 164 to connect the third planetary carrier 152 to the housing. The tenth forward gear ratio may be approximately 0.69. The step ratio from the sixth forward gear to the seventh forward gear in this configuration may be approximately 1.19.

A reverse gear may be selected by engaging the third clutch 172 to connect the first planetary carrier 140 to the second ring gear 148, engaging the first brake to connect the third ring gear 154 and the second sun gear 144 through intermediate coupling 180 to the housing 24, and engaging the third brake to connect the fourth planetary carrier 158 to the housing 24. The reverse gear ratio may be approximately −4.40.

The embodiment of the multi-speed transmission shown in FIG. 2A may include additional and/or alternative gear configurations and yet be within the scope of the present claims. For example, the truth table of FIG. 2B includes an alternate forward gear, denoted as 9A, and an alternate reverse gear, denoted as RA. Alternate forward gear 9A may be used between the ninth forward gear and the tenth forward gear, or alternatively, in lieu of the tenth forward gear. However, this alternate forward gear provides a ratio close to the ninth forward gear and the tenth forward gear resulting in a minimal step. Similarly, alternate reverse gear RA may be used in addition to or in lieu of the reverse gear described previously. However, even though the alternate reverse gear provides additional reduction, it also allows transmission of greater torque, which may require larger components.

Operation of the embodiments of the multi-speed transmission 10 shown in FIGS. 3A, 4A, 5A, and 6A are represented in the truth tables shown in FIGS. 3B, 4B, 5B, and 6B respectively. Like the truth table of FIG. 2B described in detail herein, the truth tables of FIGS. 3B, 4B, 5B, and 6B depict the combinations of clutches and brakes to establish ten forward gears, one reverse gear, a gear ratio, and a step ratio, corresponding to each speed or gear, including alternate gears, for each of the respective additional embodiments. In each embodiment disclosed herein, the transmission 10 includes four planetary gear sets and six control elements which provide ten forward gear ratios and one reverse gear ratio.

In view of the foregoing, it can be appreciated that the multi-speed transmission embodiments disclosed herein use six control elements with four planetary gear sets to provide ten forward gear ratios and one reverse gear ratio with relatively low step ratios, and relatively low clutch speeds. The plurality of clutches and brakes selectively couple various components for achieving the gear ratios required to keep the power source within a desired speed range thereby providing improved efficiency.

It will be apparent to those skilled in the art that various modifications and variations can be made in the disclosed transmission assemblies without departing from the scope of the disclosure. Other embodiments of the disclosed transmission will be apparent to those skilled in the art from consideration of the specification and practice of the transmission disclosed herein. It is intended that the specification and examples be considered as exemplary only, with a true scope of the disclosure being indicated by the following claims and their equivalents.

What is claimed is:

1. A multi-speed transmission comprising:
   an input member and an output member disposed in a housing;
   a first planetary gear set, a second planetary gear set, a third planetary gear set, and a fourth planetary gear set, each planetary gear set being disposed within the housing and including a sun gear, a planet carrier, and a ring gear;
   six control elements, at least one control element operably coupled to each of the planetary gear sets, selectively engagable to create a set of different gear ratios between the input member and the output member, the set of different gear ratios including at least ten forward gear ratios and at least one reverse gear ratio;
   a first intermediate coupling member continuously connected to the planet carrier of the fourth planetary gear set;

a second intermediate coupling continuously connected to at least one of the first and second planetary gear sets;

a third intermediate coupling member continuously connected to the sun gears of the third and fourth planetary gear sets;

a first of the six control elements selectively connecting at least one of the sun gear, the planet carrier, and the ring gear of the first planetary gear set with the first intermediate coupling member; and a second of the six control elements selectively connecting at least one of the sun gear, the planet carrier, and the ring gear of the first planetary gear set with the third intermediate coupling member;

wherein the input member is continuously connected to the sun gear of the first planetary gear set.

2. The multi-speed transmission of claim 1 in which the six control elements include a first clutch, a second clutch, a third clutch, a first brake, a second brake, and a third brake.

3. The multi-speed transmission of claim 1, in which no more than six control elements are configured to be operably coupled to the planetary gear sets.

4. The multi-speed transmission of 1, wherein at least one of the planetary gear sets is configured to include a double-orbit planetary carrier.

5. The multi-speed transmission of 4 wherein one of the second planetary gear set and the third planetary gear set is configured to include the double-orbit planetary carrier.

6. The multi-speed transmission of claim 1, wherein the first of the six control elements selectively connects the planet carrier of the first planetary gear set with the first intermediate coupling member.

7. The multi-speed transmission of claim 6, wherein a third of the six control elements selectively connects the sun gear of the first planetary gear set with the first intermediate coupling member.

8. A multi-speed transmission comprising:

an input member and an output member disposed in a housing;

a first planetary gear set, a second planetary gear set, a third planetary gear set, and a fourth planetary gear set, each planetary gear set being disposed within the housing and including a sun gear, a planetary carrier, and a ring gear;

six control elements, at least one control element operably coupled to each of the planetary gear sets, selectively engagable to create a set of different gear ratios including at least ten forward gear ratios and at least one reverse gear ratio;

a first intermediate coupling member continuously connected to the planet carrier of the fourth planetary gear set;

a second intermediate coupling continuously connected to the first and second planetary gear sets;

a third intermediate coupling member continuously connected to the sun gears of the third and fourth planetary gear sets;

a first of the six control elements selectively connecting at least one of the sun gear, the planet carrier, and the ring gear of the first planetary gear set with the first intermediate coupling member; and a second of the six control elements selectively connecting at least one of the sun gear, the planet carrier, and the ring gear of the first planetary gear set with the third intermediate coupling member;

wherein the input member is continuously connected to the sun gear of the first planetary gear set and wherein the output member is continuously connected to the ring gear of the fourth planetary gear set.

9. The multi-speed transmission of claim 8 in which the six control elements include a first clutch, a second clutch, a third clutch, a first brake, a second brake, and a third brake.

10. The multi-speed transmission of claim 8, in which no more than six control elements are configured to be operably coupled to the planetary gear sets.

11. The multi-speed transmission of 8, wherein at least one of the planetary gear sets is configured to include a double-orbit planetary carrier.

12. The multi-speed transmission of 11 wherein one of the second planetary gear set and the third planetary gear set is configured to include the double-orbit planetary carrier.

13. The multi-speed transmission of claim 8, wherein the first of the six control elements selectively connects the planet carrier of the first planetary gear set with the first intermediate coupling member.

14. The multi-speed transmission of claim 13, wherein a third of the six control elements selectively connects the sun gear of the first planetary gear set with the first intermediate coupling member.

15. A multi-speed transmission comprising:

an input member and an output member disposed in a housing;

a first planetary gear set, a second planetary gear set, a third planetary gear set, and a fourth planetary gear set, each planetary gear set being disposed within the housing and including a sun gear, a planetary carrier, and a ring gear;

no more than six control elements, at least one control element operably coupled to each of the planetary gear sets, selectively engagable to create a set of different gear ratios including at least ten forward gear ratios and at least one reverse gear ratio;

a first intermediate coupling member continuously connected to the planet carrier of the fourth planetary gear set;

a second intermediate coupling continuously connected to at least one of the first and second planetary gear sets;

a third intermediate coupling member continuously connected to the sun gears of the third and fourth planetary gear sets;

a first of the six control elements selectively connecting at least one of the sun gear, the planet carrier, and the ring gear of the first planetary gear set with the first intermediate coupling member; and a second of the six control elements selectively connecting at least one of the sun gear, the planet carrier, and the ring gear of the first planetary gear set with the third intermediate coupling member;

wherein the input member is continuously connected to the sun gear of the first planetary gear set and wherein the output member is continuously connected to the ring gear of the fourth planetary gear set.

16. The multi-speed transmission of claim 15 in which the six control elements include a first clutch, a second clutch, a third clutch, a first brake, a second brake, and a third brake.

17. The multi-speed transmission of 15, wherein at least one of the planetary gear sets is configured to include a double-orbit planetary carrier.

18. The multi-speed transmission of 17 wherein one of the second planetary gear set and the third planetary gear set is configured to include the double-orbit planetary carrier.

19. The multi-speed transmission of claim 15, wherein the first of the six control elements selectively connects the planet carrier of the first planetary gear set with the first intermediate coupling member.

20. The multi-speed transmission of claim 19, wherein a third of the six control elements selectively connects the sun gear of the first planetary gear set with the first intermediate coupling member.

* * * * *